United States Patent [19]
Lesny et al.

[11] 4,156,115
[45] May 22, 1979

[54] APPARATUS AND METHOD FOR A MULTIPLE TONE CODE SENDER SYSTEM FOR AUTOMATIC CALL INITIATION

[75] Inventors: Lucian J. Lesny, Addison; Peter J. Flynn, Wheaton, both of Ill.

[73] Assignee: GTE Automatic Electric Laboratories Incorporated, Northlake, Ill.

[21] Appl. No.: 891,883

[22] Filed: Mar. 30, 1978

[51] Int. Cl.² ............................................. H04M 1/50
[52] U.S. Cl. .................................. 179/84 VF; 331/51
[58] Field of Search .................. 179/84 VF, 175.2 R, 179/175.2 A; 331/51; 328/14, 18, 48; 307/210, 271

[56] References Cited

U.S. PATENT DOCUMENTS

3,719,897  3/1973  Tarr ...................................... 331/51

Primary Examiner—Kathleen H. Claffy
Assistant Examiner—Joseph A. Popek

[57] ABSTRACT

A tone sender system for producing analog tone pairs for transmission of the digits comprising a telephone number. Dual codes, multi-frequency and touch calling multi-frequency, are produced to generate simulated test call originations. This tone sender system provides in a single source the capability to generate telephone call originations requiring either multi-frequency (MF) or touch calling multi-frequency (TCMF) tone pairs for the digit transmission. The tone code to be utilized is selectable.

12 Claims, 7 Drawing Figures

MULTIPLE TONE CODE SENDER SYSTEM

APPARATUS AND METHOD FOR A MULTIPLE TONE CODE SENDER SYSTEM FOR AUTOMATIC CALL INITIATION

BACKGROUND OF THE INVENTION

1. Field of the Invention

The present invention relates to tone transmission in test call generation systems and more particularly to the automatic sending of coded tones in a particular one of several codes in order to transmit the digits comprising a telephone directory number.

2. Description of the Prior Art

In the transmission of telephone directory numbers between switching centers and between a subscriber and a switching center the use of multiple-frequency (MF) signaling and touch calling multiple-frequency signaling (TCMF) respectively, is well known. These signaling schemes employ the use of coded tone signals for the transmission of digits comprising the directory number. A collection of predetermined frequencies forms the basis for each of these signaling codes. Multiplefrequency (MF) signaling selects two out of a group of six frequencies for transmission to form a given digit, whereas touch calling multiple-frequency (TCMF) depends upon the selection of two of eight frequencies for transmission to form a particular digit comprised of a telephone directory number.

Historically, these tone codes have been generated by separate circuits in a telephone office. Heretofore, the technology employed has embodied the use of LC oscillators for the generation of these tones in call initiation systems. Such systems have utilized separate circuits for the generation of these tone frequencies. The use of separate tone generation equipment necessitates the use of separate control logic for the application of these tone signals. Such systems are necessarily complex and require extensive maintenance. In addition, these systems present a multiplicity of design problems and prohibit subsystem modularity.

U.S. Pat. No. 3,719,897 issued on Mar. 6, 1973, to L. A. Tarr, depicts a system in which a tone generator system is used to diagnose tone receiving equipment in a telephone office. In the Tarr patent a single input signal selects a single frequency of either MF or TCMF. Although in the Tarr patent the use of a crystal controlled clock is disclosed, only a single frequency of the two necessary for digit identification is generated.

Therefore, it is an objective of the present invention to provide a single source for the generation of digits comprising a telephone directory number in either the multi-frequency or touch calling multi-frequency codes. Such source provides for simulation of either line or trunk call originations and basic subsystem modularity for simple design.

SUMMARY OF THE INVENTION

The present invention consists of a tone sender system which provides in a single source the capability to originate telephone calls in either a multi-frequency (MF) or touch calling multi-frequency (TCMF) code. In each of these transmission codes, a combination of analog tone pairs is produced to represent a digit of a telephone number. Each of the tones comprising the telephone number digit is of a predetermined frequency. The tone sender described herein is connected to a telephone central office and generates simulated line or trunk originations depending upon the transmission code selected. This tone sender is designed to be controlled by digital signals applied by an appropriately timed telephone office central processor control system.

The control system consists of a central processor with memory. The central processor is connected to bistable latches via bi-directional bus. The bistable latches, in turn, are connected to the initial stage of the tone sender circuitry, the decode logic. The signals sent from the bistable latches to the decode logic comprise a binary coded decimal representation of a telephone digit to be transmitted. Four of such signals from the latches are required for this purpose. The bistable latches further provide an additional set of supervisory signals. These supervisory signals indicate to the tone sender system the particular transmission code in which the given digit is to be sent.

The decode logic provides isolation between the bistable latches and the tone sender circuitry. The signals from the bistable latches are decoded from their binary coded decimal form to a collection of binary signals each representing a particular telephone digit. In the MF signaling code, ten of these signals are required to represent the digits (0 through 9) comprising a telephone number and the remaining six of these signals are used for various supervisory signaling purposes; whereas, in the TCMF transmission code twelve of these signals are required to represent the digits (0 through 9 and special functions * and #) leaving four signals remaining for supervisory signaling purposes.

These signals are then encoded into a pair of signals in each transmission code (MF and TCMF) which represent the digit to be sent. The pair of signals thereby produced for each transmission code represents the tone frequencies associated with the given digit in that particular code, with each signal representing a particular predefined frequency. For example, the digit 0 is represented by the frequencies 1300 Hz and 1500 Hz in MF and by the frequencies 941 Hz and 1336 Hz in TCMF.

The supervisory signals supplied by the bistable latches are utilized to gate the signals representing the given digit in the selected transmission code into a frequency encode network for subsequent processing. Next, the selected pair of digit representative signals is further encoded into two sets of signals, representing the time periods of corresponding frequencies which comprise the given digit. These time period representation signals are applied to two independent counting chains along with an input signal from a 1 MHz crystal controlled clock. The clock provides a constant source of pulses; one pulse per microsecond. Each of the two counting chains produces one of the tone frequency signals comprising the given digit. The frequency signals so produced are in the form of square waves of the desired frequencies.

Lastly, these two resultant square waves are combined and converted into a single sine wave of the appropriate frequency by filtering out any undesirable frequency components. The combined output signal is amplified and now is suitable for coupling to a transmission line. This output frequency signal remains present at the output as long as the bistable latches are controlled to provide the signals to the tone sender system. Under control of the central processor, the bistable latches preserve their present signal statuses for a predetermined time period of approximately 60 ms.

Upon expiration of the above mentioned time interval, the central processor resets the bistable latches thereby creating an absence of the output frequency signal of the tone sender system. Similar to the signal application interval, a signal absence interval is timed for a period of approximately 60 ms. As a result, a pulse of tone is produced which represents the given telephone digit in the appropriate transmission code.

The complete initiation of a line or trunk call origination includes a cyclic repetition of the above process for each of the digits comprising a telephone number. In order to initiate a line origination the TCMF transmission code is utilized and in order to initiate a trunk origination the MF code is employed. The present tone sender system, although embodying TCMF and MF codes, is easily adaptable to send other tone signaling codes.

BRIEF DESCRIPTION OF THE DRAWINGS

FIGS. 4 and 5 represent schematic diagrams for MF and TCMF low frequencies and MF and TCMF high frequencies respectively.

DESCRIPTION OF THE PREFERRED EMBODIMENT

Figure 1:
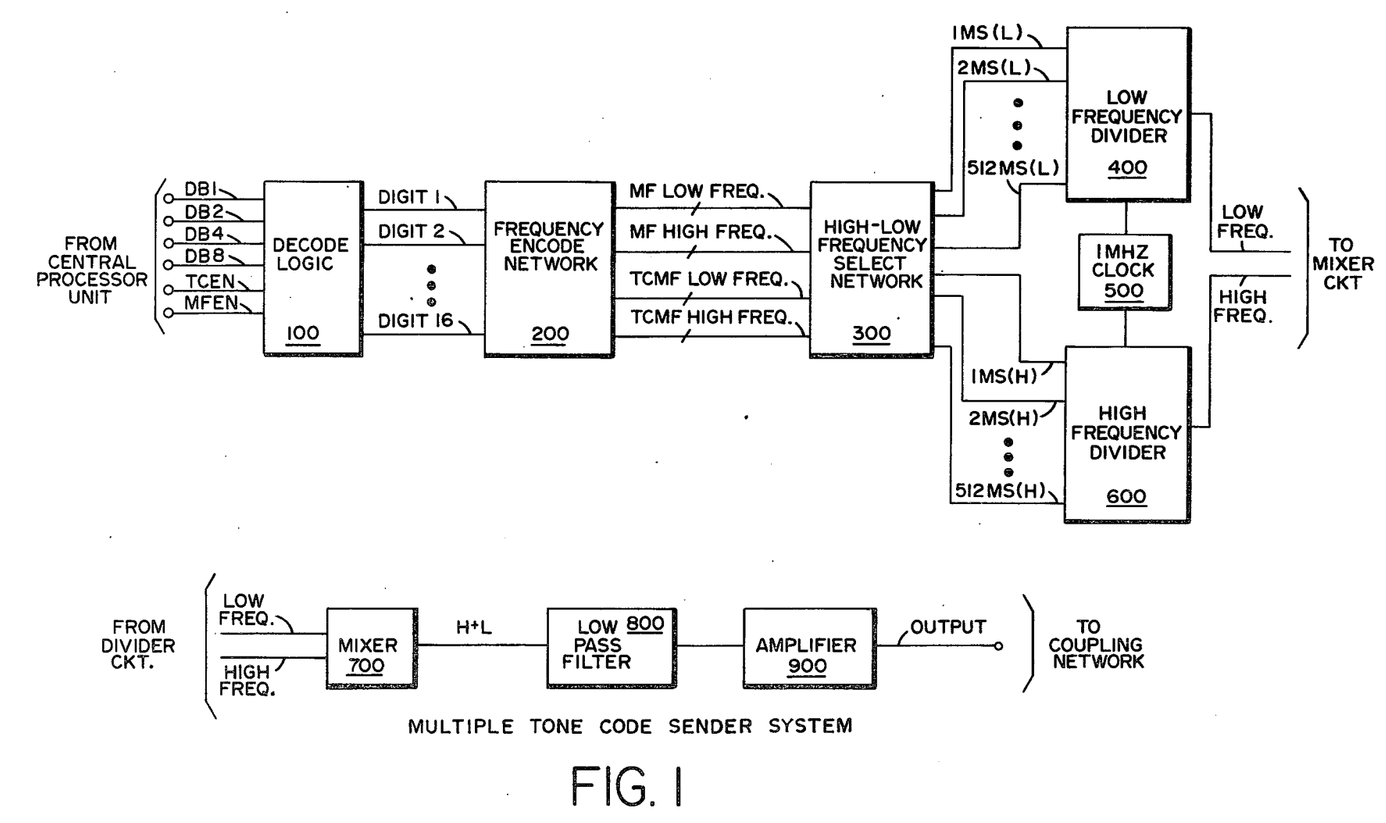
FIG. 1 is a block diagram of a multiple tone code sender system in accordance with the present invention.

In FIG. 1, a block diagram of a multiple code tone sender system is shown in accordance with the present invention. The multiple tone code sender includes decode logic 100 connected to a central processor unit via a bank of bistable latching devices (not shown). The decode logic provides isolation between the remainder of the tone sender circuitry and the bistable latching devices. The central processor sends, via the latches a telephone digit to be transmitted. Input signals DB1 through DB8 which represent the digit in binary coded decimal form are decoded to form signals digit 1 through digit 16 at the output of decode logic 100.

Signals digit 1 through digit 16 are combined and coded by frequency encode network 200 to produce four groups of signals, each signal is representative of a predetermined frequency associated with each transmission code (MF and TCMF). Two frequency groups are associated with each transmission code. One frequency in each of the following groups is produced for a given digit: MF low frequency, MF high frequency, TCMF low frequency, and TCMF high frequency. Each of these frequency groups comprises a collection of predetermined frequencies. One frequency in each of the four groups is selected by the application of the telephone digit from the central processor unit.

Signals TCEN and MFEN determine which two of the four frequency groups are permitted to be processed further by high-low frequency elect network 300. High-low frequency select network 300 processes the selected two groups of frequency representative signals in the selected transmission code. These signal groups are each further coded to produce signals representing the time periods associated with each of the two selected frequencies representing the digit.

Each set of time period representative signals is respectively applied to a corresponding frequency divider 400 and 600. Furthermore, a signal from the 1 MHz crystal controlled clock 500 is applied to each frequency divider. As a result of the application of the combination of these signals, low frequency divider 400 and high frequency divider 600 produce low frequency and high frequency square waves, respectively.

These resultant square waves are applied to mixer 700, whereby a single output signal is produced representing the sum in sine wave form of the input square wave frequencies. This is accomplished by filtering out any undesirable frequency components via low pass filter 800. This combined signal is amplified through amplifier 900 and produces an output suitable to be coupled to the transmission line.

The central processor unit applies signals DB1 through DB8 and TCEN and MFEN to the bistable latches for a predetermined time period approximating 60 ms. Upon expiration of this time period a like time period of 60 ms. is timed during which the bistable latches are reset thereby producing an absence of any tone frequency signal output from the tone sender system. As a result, a pulse of tone is produced which represents in coded form the given digit to be transmitted. The complete initiation of a telephone call origination includes a repetition of the described process, thereby producing a series of tone pulses which collectively represent the telephone number to be transmitted.

Figure 2:
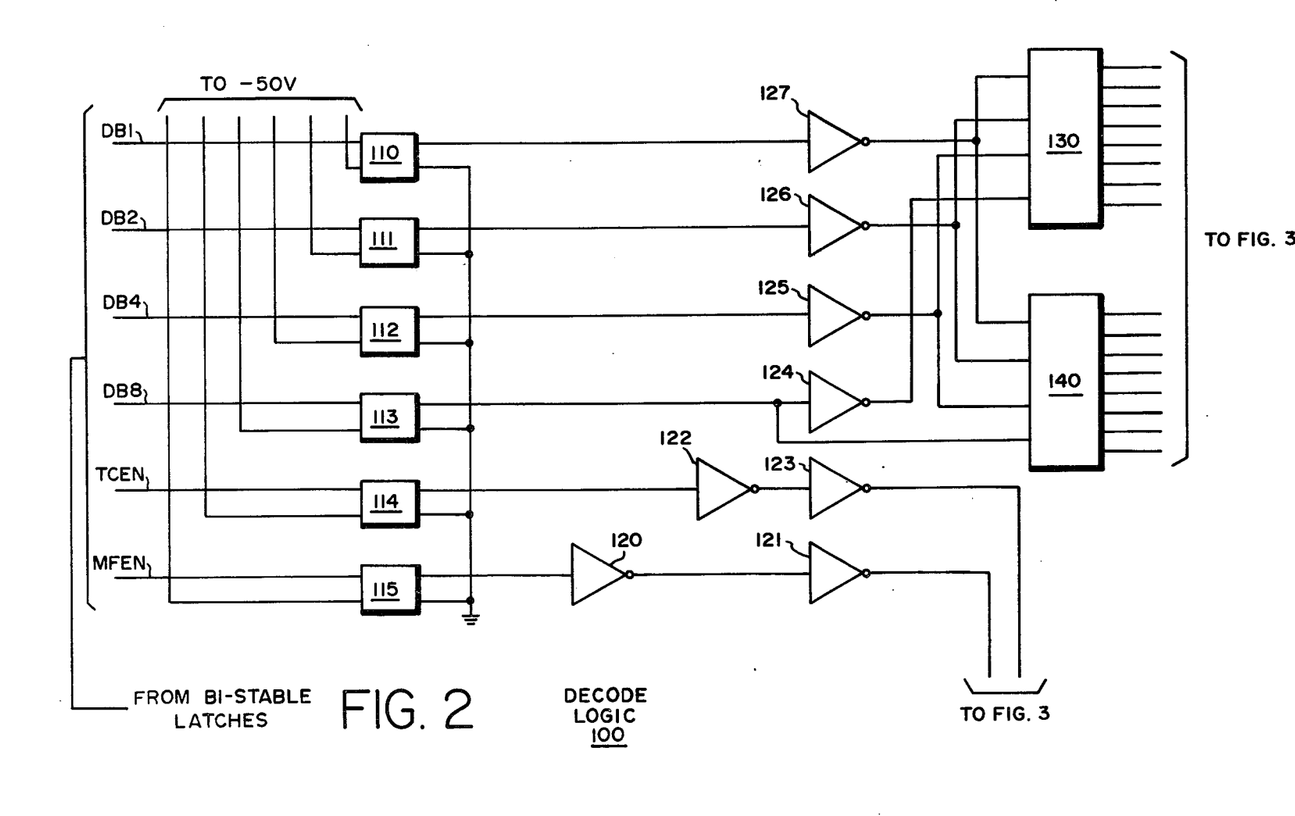
FIG. 2 is a schematic circuit diagram of a decode logic circuit in the present invention.
Figure 3:
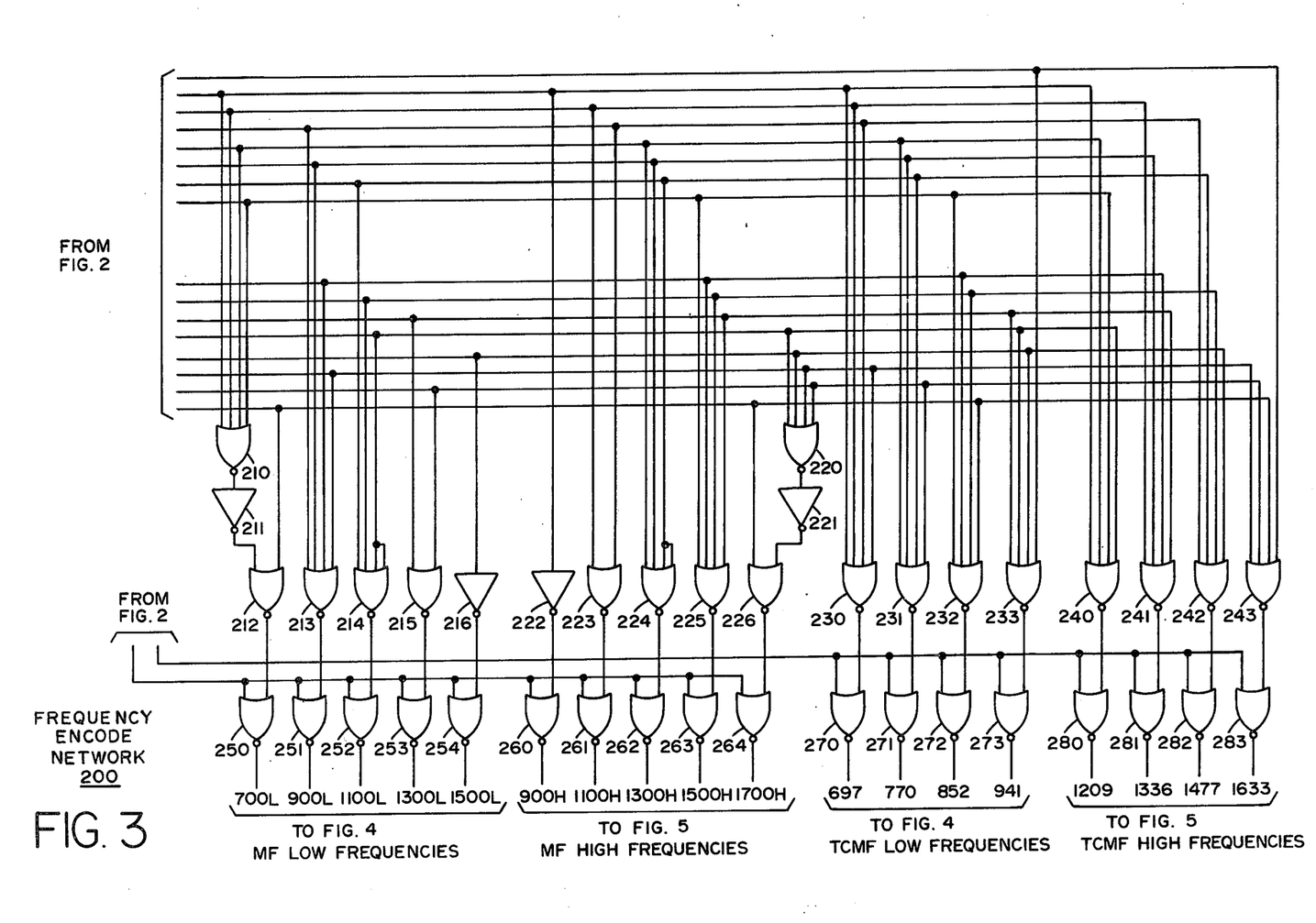
FIG. 3 is a schematic circuit diagram of a frequency encode network for the transmission of representative frequency signals in the present invention.

Now referring to FIGS. 2 and 3, taken in combination with FIG. 2 to the left of FIG. 3, input signals DB1 through DB8 and supervisory signals TCEN and MFEN are applied to optical-couplers 110 through 115 respectively, thereby producing representative signals which are isolated from the latching circuitry. The signals thereby produced are inverted via inverters 124 through 127. The output signals of the inverters 124 through 127 are applied to the BCD to binary decoders 130 and 140. Each BCD to binary decoding device generates eight output signals. Each of these outputs indicates either a logic "0" of logic "1" state. The signals comprising the frequencies of the digit are marked by a logic "1", all other signals are marked by a logic "0".

These binary outputs are interconnected by encoding gates 210–216, 220–226, 230–233 and 240–243 to generate signals each representative of a frequency associated with one of the transmission codes. This encoding structure includes a plurality of NOR gates and inverting gates. The output signals at gates 212 through 216 and 222 through 226 represent the frequencies associated with the given digit in the multi-frequency code and the output signals at gates 230 through 233 and 240 through 243 represent the frequencies associated with the given digit in the touch calling multi-frequency code.

These representative frequency signals are combined with the enabling signals output by gates 121 and 123. The output signals of gates 121 and 123 represent the multi-frequency and touch calling multi-frequency enable signals respectively. The MF enabling signal produced by gate 121 is combined with the MF representative frequency signals at gates 250–254 and 260–264. The touch calling enable signal produced at gate 123 is combined with the TCMF representative frequency signals at gates 270-273 and 280-283. Via control of the supervisory signals of gates 121 and 123, the frequency representative signals of either the MF or the TCMF code are gated through for subsequent processing.

Figure 4:
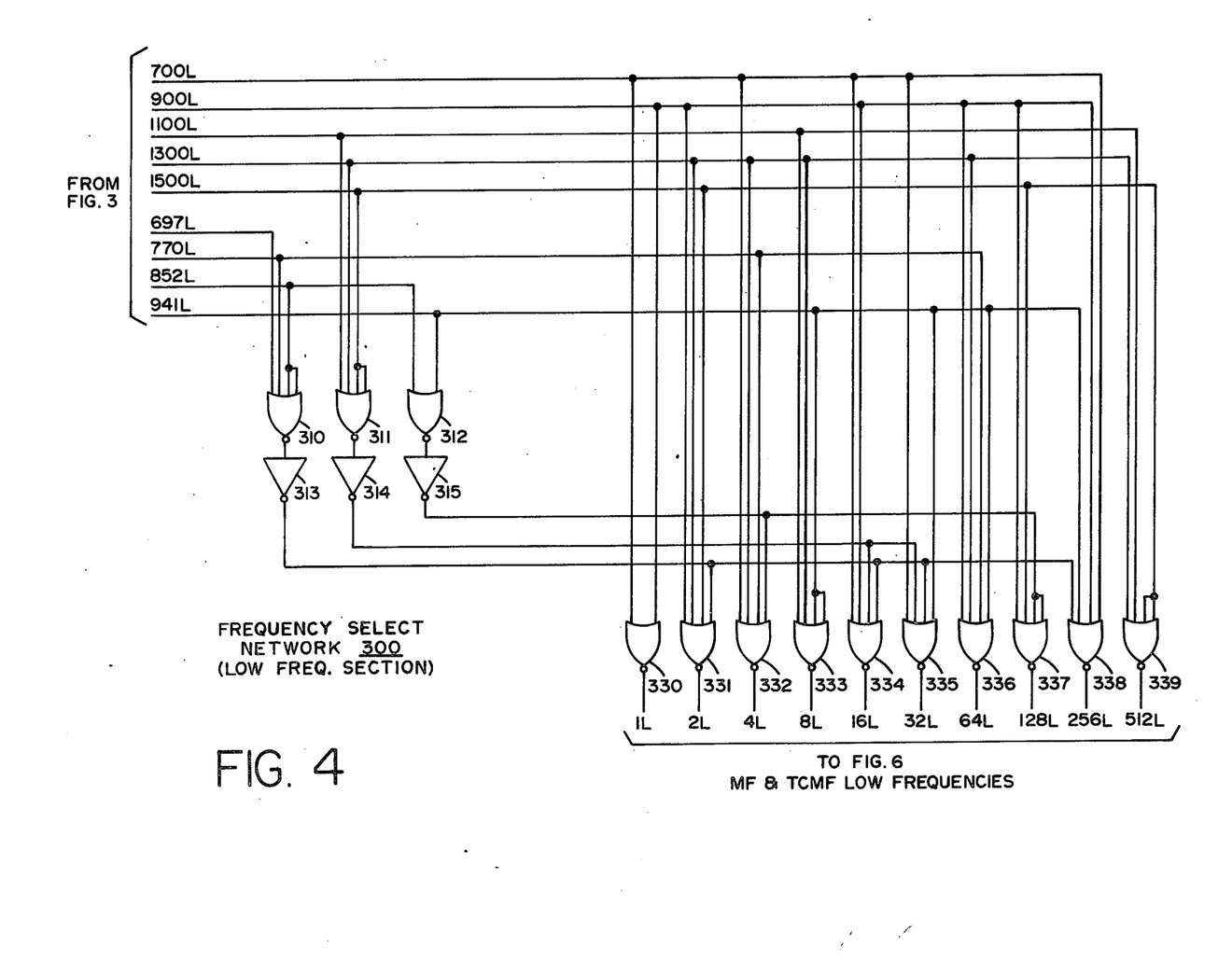
FIGS. 4 and 5, taken in combination, are schematic circuit diagrams of an encoding circuit for selection of time period representative signals of MF and TCMF frequencies in the present invention.
Figure 5:
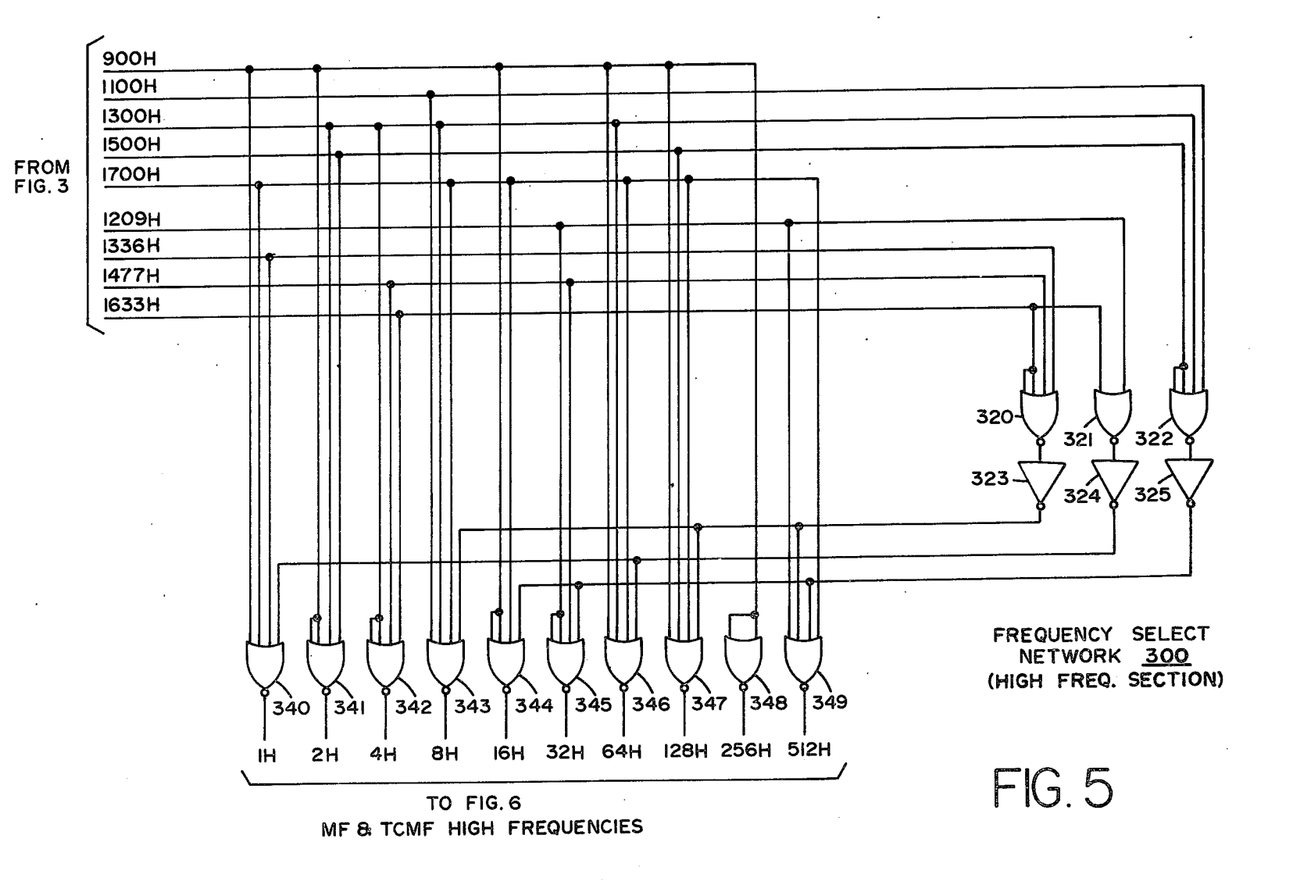

As shown in FIGS. 4 and 5, each of the frequency representative signals comprising the digit in the selected code is further encoded to produce a set of signals representative of the time periods associated with each of the frequencies comprising the digit. The low frequency of the selected transmission code is encoded by gates 310-315 and 300-339; whereas, the high frequency representative signals are encoded by gates 320-325 and 340-349 to produce the time period signals.

Figure 6:
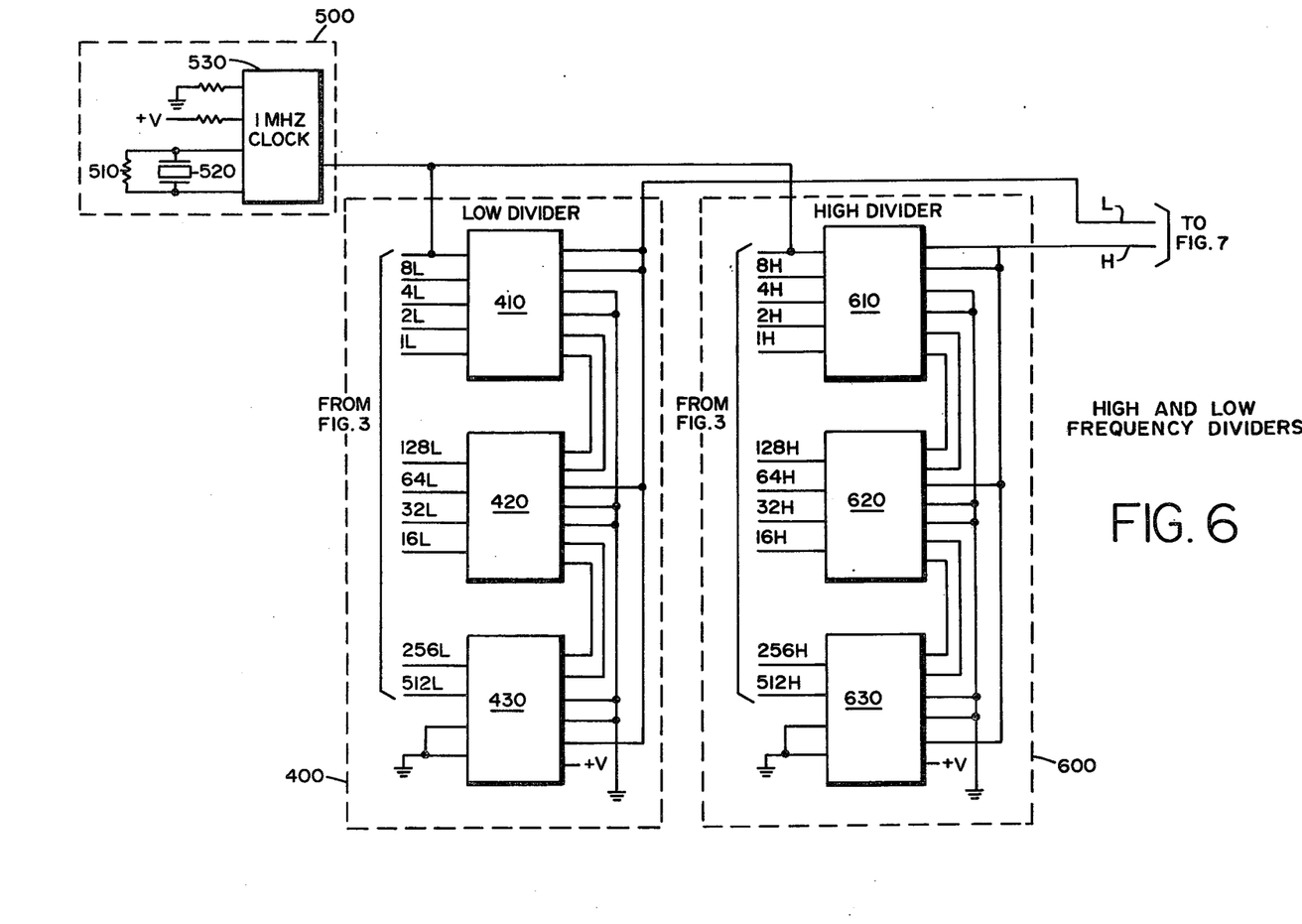
FIG. 6 is a schematic circuit diagram of twin frequency divider circuits for production of frequency signals in the present invention.

Referring now to FIG. 6, each set of time period signals is applied to the appropriate frequency divider. Also applied to each frequency divider is a signal from the 1 MHz clock 500. Each frequency divider network 400 and 600 includes three programmable divide by N 4-bit counters. These programmable divide by N counters are of a standard commercially available type. The low frequency time period signals are applied to divider 400 and the high frequency time period signals are applied to divider 600. The high and low dividers each produce a single output signal H and L respectively.

Figure 7:
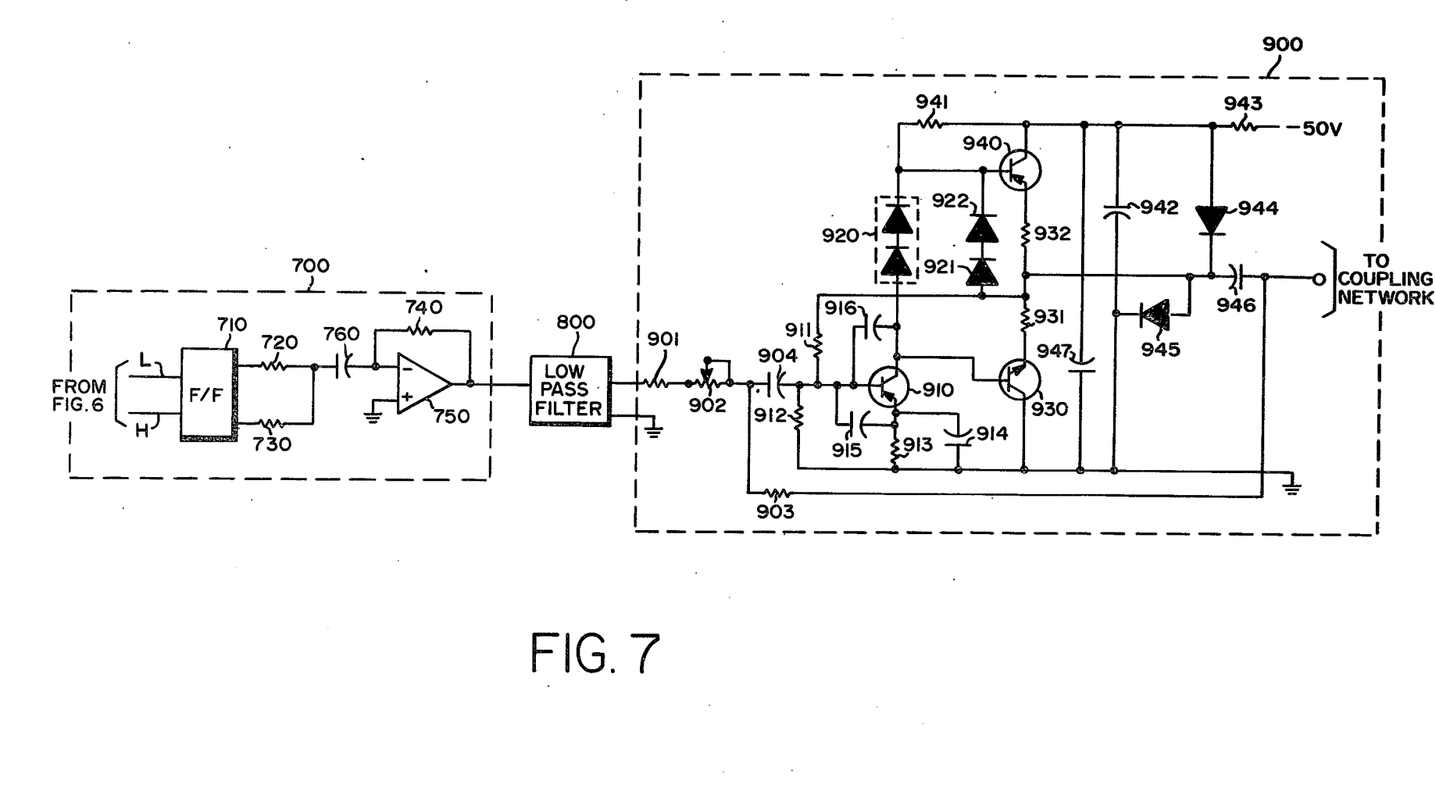
FIG. 7 is a schematic circuit diagram of a mixer, low pass filter and associated amplifier in the present invention.

As indicated in FIG. 7, signals H and L, the high and low frequency signals respectively, are applied to flip-flop device 710 thereby producing square waves of the appropriate frequencies. The flip-flop device 710 is conventional and does not form a portion of the present invention. The flip-flop output signals are respectively applied to resistors 720 and 730. The output signals of these resistors are added together by directly connecting the two signals produced by the resistors. The signal thereby produced is applied to amplifier 750. The output signal of amplifier 750 is applied to low pass filter 800 thereby producing a single signal representative of the two predetermined frequencies which comprise a given digit. This signal is applied to amplifier 900 which includes transistors 910, 930 and 940 to produce a suitable signal for coupling to the transmission network.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A multiple-code tone sender for use in a telecommunication system for automatically transmitting the digits of a telephone number; said system including a central processor with memory, a plurality of bi-stable latching devices connected to said central processor via a bidirectional bus structure, a periodic pulse source and a timer connected to said central processor, operated to periodically gate input signals representative of a selected digit and supervisory signals representative of a selected one of said codes to said bi-stable latching devices; said multiple code tone sender comprising:
   decoding means connected to a first group of said bi-stable latching devices, operated in response to signals from said latching devices representative of said selected digit to generate a plurality of coded signals representative of said selected digit;
   first encoding means connected to said decoding means operated in response to said coded signals to generate a first and a second plurality of signals, said first plurality representative of tone frequencies associated with said selected digit in a first code and said second plurality representative of tone frequencies associated with said selected digit in a second code;
   second encoding means connected to said first encoding means, and to a second group of said latching devices, operated in response to one of said pluralities of first encoding means signals and to said supervisory signals representing said selected code to produce a plurality of signals representing the binary codes for particular time periods corresponding to the particular frequencies of the selected digit in said selected code;
   counting means connected to said second encoding means and to said pulse source, periodically operated in response to said time period signals and to pulses from said pulse source to produce at least two output signals representing said selected digit, each of said output signals of a different predetermined frequency;
   addition means connected to said counting means and operated in response to said counting means output signals to produce a composite output signal representing the sum of said counting means output signals and representative of said selected telephone number digit in said selected code.

2. A multiple-code tone sender as claimed in claim 1, wherein: said decoding means includes a binary converter connected to said first encoding means and a plurality of isolation devices each connected between one of said bi-stable latching devices and said converter.

3. A multiple-code tone sender as claimed in claim 2, wherein: said plurality of isolation devices each consist of an optical-coupler device.

4. A multiple-code tone sender as claimed in claim 2, wherein: said connections between said isolation devices and said binary converter each further include inverting means.

5. A multiple-code tone sender as claimed in claim 1, wherein: said first encoding means includes a plurality of NOR gates each including input circuit connections from said decoding means and each including an output circuit connection to said second encoding means.

6. A multiple-code tone sender as claimed in claim 1, wherein: said second encoding means including first and second pluralities of NOR gates, said first plurality of second encoding means NOR gates each including an input circuit connection to said first encoding means and to said second group of latching devices, and each of said first plurality of NOR gates further includes a plurality of output circuit connections to said second plurality of NOR gates and each of said second plurality of NOR gates including an output circuit connection to said counting means.

7. A multiple-code tone sender as claimed in claim 1, wherein: said addition means includes an amplifier and at least two resistors, each of said resistors connected to said counting means and said resistors further include a common connection to said amplifier.

8. A multiple-code tone sending method for the transmission of the digits of a telephone number via tone frequencies by generating a plurality of supervisory input signals and a plurality of input signals which respresent a selected digit of said telephone number, comprising the steps of:
   decoding said plurality of input signals which represent a selected telephone digit into a plurality of first output signals which form a binary representation of said selected digit;

encoding said plurality of first output signals into a plurality of second output signals representative of frequencies of a first and second characteristic of a first code and of a first and second characteristic of a second code;

generating said second output signals representing frequencies of said encoded first and second characteristics of said first code in response to a first supervisory input signal or alternatively generating said second output signals representing frequencies of said encoded first and second characteristics of said second code in response to a second supervisory input signal;

encoding said second output signals into a first and a second group of third output signals, said groups of outputs each representing a binary code for the time period of said first and said second frequency representative signals respectively;

dividing a predetermined frequency of pulses from a periodic pulse source by said first and by said second groups of third output signals, to produce first and second fourth output signals of first and second frequencies respectively;

adding said first and second fourth output signals; and generating a fifth output signal representing the sum of said fourth output signals.

9. A multiple-code tone sending method as claimed in claim 8, wherein: there is included the additional step of:

timing the application of said input signals to produce said resultant fifth output signal representative of said sum of said frequencies for a predetermined time interval.

10. A multiple-code tone sending method as claimed in claim 8, wherein: there is included the additional step of:

timing the removal of said plurality of input signals for a predetermined time interval to produce an absence of said fifth output signal.

11. A multiple-code tone sending method as claimed in claim 8, wherein: there are included the additional step of:

timing the application of said input signals to produce said resultant fifth output signal representive of said sum of said frequencies for a predetermined time interval; and timing the removal of said plurality of input signals for a predetermined time interval to produce an absence of said fifth output signal.

12. A multiple-code tone sending method as claimed in claim 11, wherein: the steps of timing the application of said input signals and timing the removal of said input signals are cyclically repeated for each of said digits of said telephone number.

* * * * *